Dec. 24, 1968   J. G. CALL   3,417,564
JET ENGINE WITH RELATIVELY ROTATABLE COMBUSTION
MEANS, INTAKE MANIFOLD AND EXHAUST MANIFOLD
Filed April 19, 1967   6 Sheets-Sheet 5

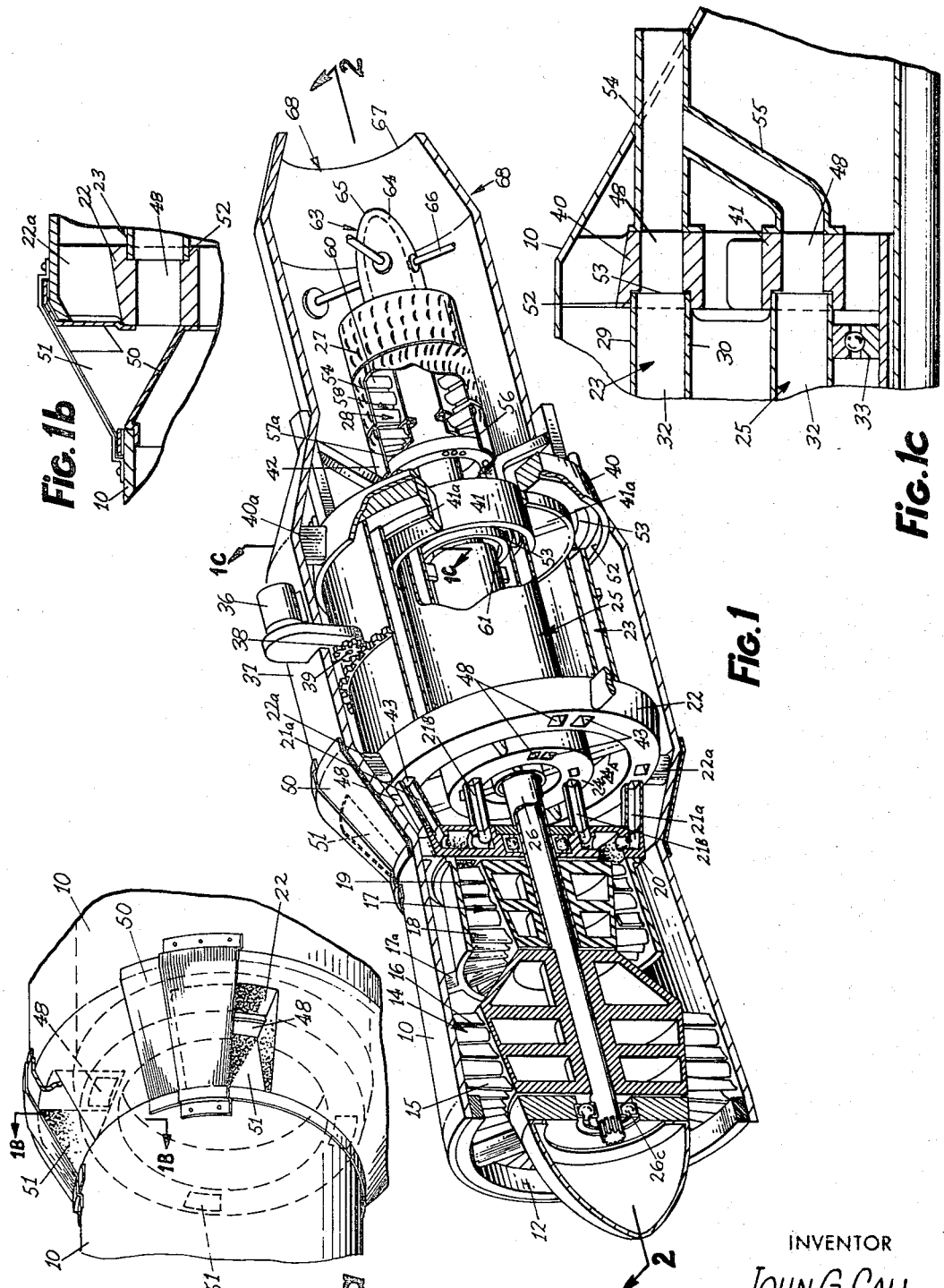

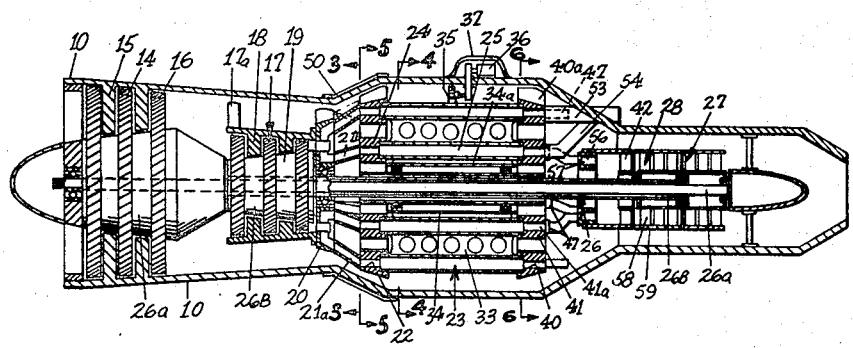
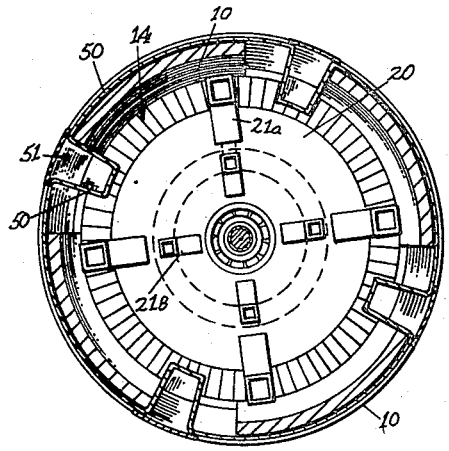
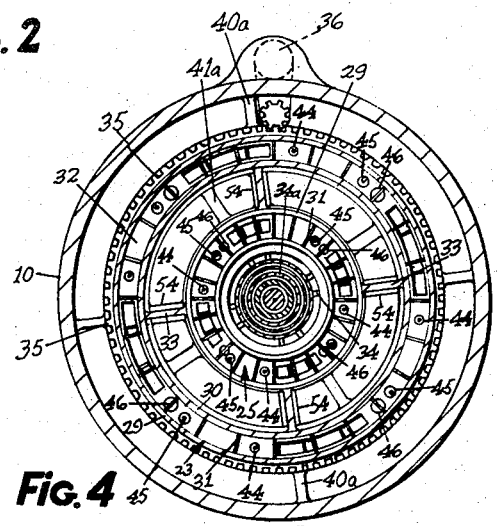
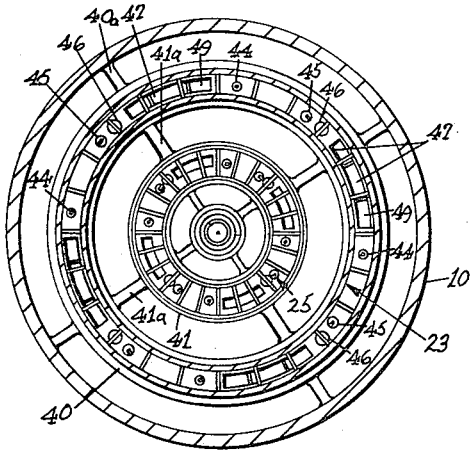
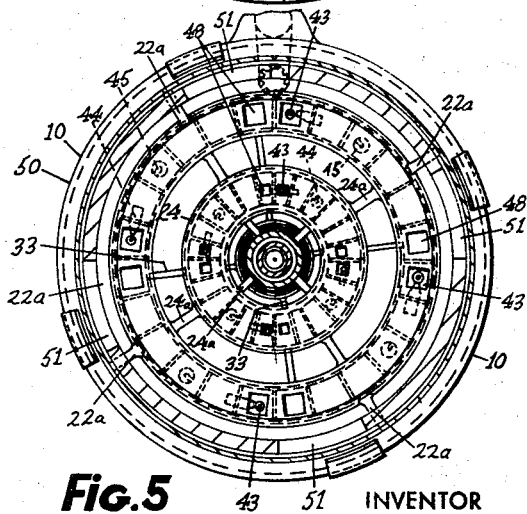

INVENTOR
JOHN G CALL,
BY MELVILLE, STRASSER, FOSTER & HOFFMAN
ATTORNEYS

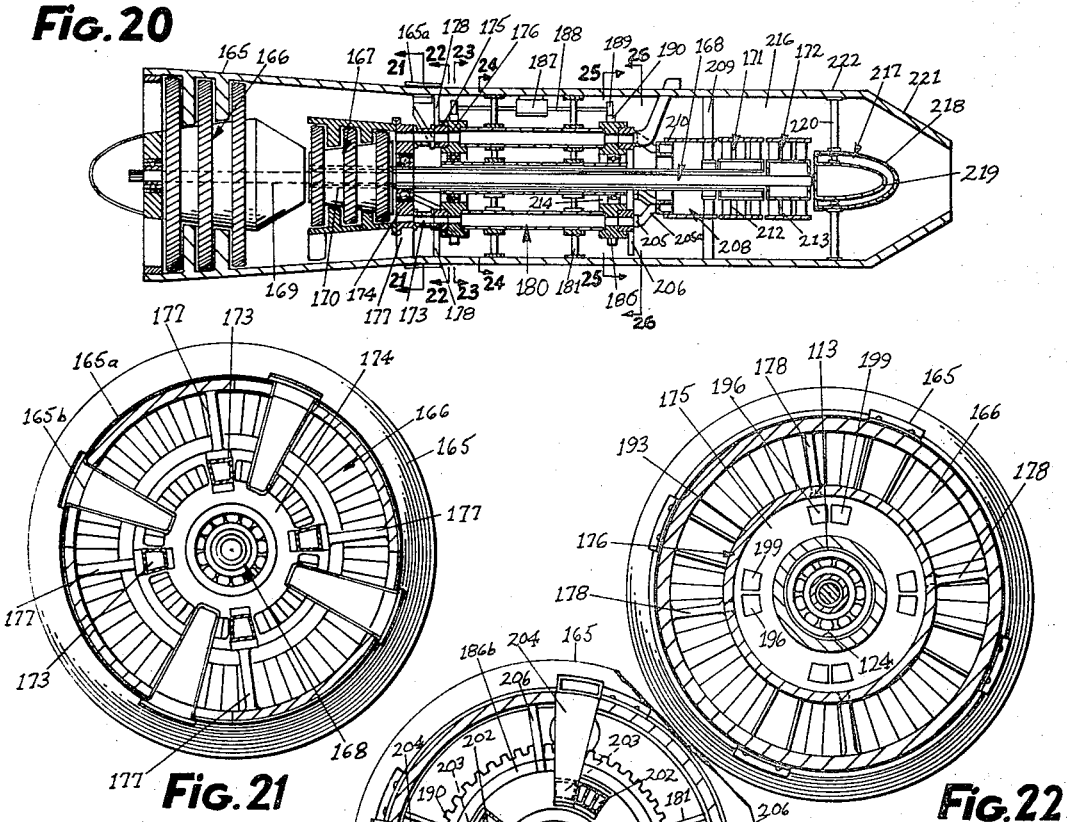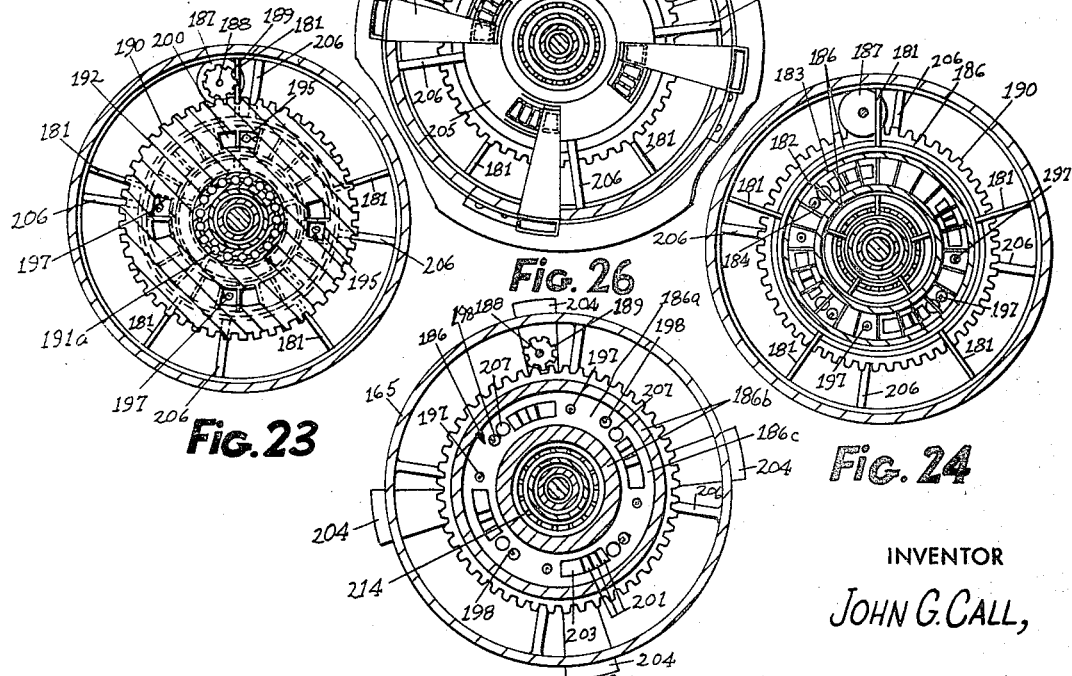

United States Patent Office 3,417,564
Patented Dec. 24, 1968

3,417,564
JET ENGINE WITH RELATIVELY ROTATABLE
COMBUSTION MEANS, INTAKE MANIFOLD
AND EXHAUST MANIFOLD
John G. Call, 2332 NE. 20th St.,
Fort Lauderdale, Fla. 33305
Filed Apr. 19, 1967, Ser. No. 631,951
33 Claims. (Cl. 60—39.34)

ABSTRACT OF THE DISCLOSURE

A constant volume combustion gas turbine engine which utilizes either stationary manifolds and the firing of rotary cylinders, or rotary manifolds and the firing of stationary cylinders.

BACKGROUND OF THE INVENTION

Field of the invention

This invention relates to a reaction propulsion system for producing a high velocity hot gas stream for use either at high aircraft speeds or for a stationary power plant.

Description of the prior art

The known jet propulsion units are divided into three types: turbo jet or engine jet units; ram jet units; and pulse jet units. Jet units which employ a rotating compressor are known as turbo jet units or engine jet units, according to whether the compressor is affected by a turbine or piston engine, respectively. Generally speaking, a turbo jet or engine jet unit which utilizes constant pressure combustion is limited in its use because of its low thrust horsepower at low speeds and its very inefficient operation at low power levels. Also, a turbo jet or engine jet unit provides slow acceleration from minimum to maximum power levels. Various thrust augmentation methods have been utilized to improve the thrust of turbo jet engines for short periods of time: a rocket assist, after burning (reheating), water-alcohol injection, and the bypassing of a portion of the compressed air around the combustion chamber and returning it to the jet stream at the rear of the turbine. However, these methods have proved to be ineffective in overcoming the aforementioned disadvantages.

A special type of gas turbine engine is the explosion turbine, such as, for example, the Holzwarth explosion turbine, wherein fuel is burned at constant volume in a combustion chamber. In such a turbine the combustion chamber is first filled with air which has been previously compressed in an air compressor, and then fuel is admitted into the chamber by means of a separate fuel pump. The fuel-air is then exploded by an electric spark, the pressure rising substantially while the volume remains constant. However, constant volume explosion turbines have proved to be unsuccessful because they are of low efficiency due to the low pressures which are used.

With the foregoing considerations in mind, it is therefore, an object of the present invention to provide an improved constant volume combustion gas turbine engine which substantially alleviates the above mentioned disadvantages.

A yet further object of the instant invention is to provide an improved constant volume combustion gas turbine engine which is simple in construction, economical to manufacture, and otherwise well suited to the purpose for which it is designed.

A further object of the instant invention is to provide an improved constant volume combustion gas turbine engine which utilizes rotary firing cylinders and stationary intake and exhaust manifolds.

Still another object of the instant invention is to provide an improved constant volume combustion gas turbine engine which utilizes rotary intake and exhaust manifolds and stationary firing cylinders.

A further object of the instant invention is to provide a practical constant volume combustion gas turbine engine which is much more efficient in operation than any constant-volume gas turbine engines which are presently in use, or than any turbo jet units which utilize constant pressure combustion.

These and other objects of the invention, which will be described in greater detail hereinafter, or which will be apparent to one skilled in the art upon reading these specifications, are accomplished by that certain construction and arrangement of parts of which the following describes an exemplary embodiment.

Summary of the invention

In the embodiment of the instant invention shown in FIGURES 1 through 8, a constant volume, combustion gas turbine engine, utilizing stationary intake and exhaust manifolds and rotary inner and outer vaned cylinders as combustion chambers, is shown. Briefly, in operation, intake air is initially compressed by a low stage or ancillary engine compressor. A portion of the initially compressed intake air is bypassed through the engine and the remainder is subjected to a further compression by a high stage or main engine compressor. The compressed air from the main engine compressor is ducted into intake manifolds which communicate with the rotary inner and outer vaned cylinders. As the cylinders rotate, they traverse various orifices in the intake manifolds, at which compressed intake air, fuel and scavenge air enter the cylinders. As an alternative arrangement, fuel, instead of being mixed directly with the incoming air, may be injected directly into the cylinders. The compressed intake air-fuel mixture in the rotating cylinders is then ignited. The escaping gases are exhausted through exhaust manifolds and, as is the case with the rotary outer vaned cylinders, exhaustion from the exhaust manifolds is either directly into the atmosphere or into the exhaust nozzle in the rear engine housing. The exhaust gases from the exhaust manifold for the rotary vaned inner cylinders, which acts as a transition liner, proceed through a turbine nozzle which appropriately directs them for expansion through both a high pressure and low pressure turbine, which operate the main and ancillary engine compressors, respectively, before they are finally exhausted to the atmosphere through the exhaust nozzle. The by-pass air from the low stage compressor is utilized to cool both the exhaust manifold for the rotary inner vaned cylinders and the turbine blades. Additionally, the by-pass air is fed into the gas stream in the exhaust unit thereby aiding to expand the gas stream so as to produce greater thrust from the final nozzle and resulting in better propulsive efficiency and better economy for a given thrust.

Another embodiment of the instant invention, FIGURES 9 through 13, discloses a constant volume combustion gas turbine engine, utilizing stationary intake and exhaust manifolds and one drum of rotary vaned cylinders as combustion chambers. The engine of this embodiment is also a by-pass engine, part of the air flow not being passed through the main engine compressor and one drum of rotary firing cylinders being utilized as a cooling medium, particularly for the first and second stage turbines. The by-pass air also reaches the gas stream in the exhaust unit, aiding to expand the gas stream so as to produce greater thrust from the final nozzle and resulting in better propulsive efficiency and better economy for a given thrust. The portion of the air flow through the main engine compressor is compressed and ducted to the stationary intake manifold where it is conveyed into the rotary firing cylinders as the cylinders traverse orifices in the intake manifold. Fuel is injected into the cylinders or mixed with the air as the air is received into the cylinders, and ignited. The resulting exhaust gases proceed through the exhaust manifold, which acts as a transition liner, and also into the first stage turbine nozzle where they are directed for expansion through the first and second stage turbines, the turbines which power the ancillary and main engine compressors, after which they are finally exhausted through the exhaust nozzle to the atmosphere.

A further embodiment of the instant invention, FIGURES 14 through 19, discloses a constant volume, combustion gas turbine engine which utilizes both inner and outer rotary intake and exhaust manifolds and two stationary inner and outer drums of vaned cylinders as combustion chambers. The engine of this embodiment is also a by-pass engine, utilizing a portion of the intake air for cooling purposes and for increased efficiency, as explained in connection with embodiments No. 1 and No. 2. The portion of the air flow through the main engine compressor is compressed and ducted through orifices in two rotary intake manifolds and into the two stationary drums of vaned cylinders as the orifices traverse the vaned cylinders, the outer rotary intake manifold communicating with the outer stationary drum of vaned cylinders, and the inner rotary intake manifold communicating with the inner stationary rotary drum of vaned cylinders. Fuel is either mixed with the compressed air as the air proceeds into the vaned cylinders or is injected directly into the vaned cylinders, and the resulting mixture of fuel and air is ignited. The exhaust gases from the firing of the stationary drums of vaned cylinders proceed to the rotary exhaust manifolds, the exhaust gases from the outer stationary drum of vaned cylinders being exhausted through orifices in the outer rotary exhaust manifold either directly into the atmosphere or into the exhaust nozzle in the rear engine housing, and the exhaust gases from the inner stationary drum of vaned cylinders being exhausted through orifices in the inner rotary exhaust manifold, which acts as a transition liner, into a first stage turbine nozzle. The first stage turbine nozzle directs the exhaust gases fror the inner drum through the first and second stage turbines which power the several engine compressor units. The exhaust gases from the stationary inner drum of vaned cylinders are then exhausted through the final exhaust nozzle along with that portion of the intake air which was bypassed through the engine.

Still another embodiment, FIGURES 21 through 26, discloses a constant volume, combustion gas turbine engine which utilizes rotary intake and exhaust manifolds and one stationary drum of vaned cylinders, as combustion chambers. The engine of this embodiment also utilizes a portion of the intake air for cooling purposes, after which it is fed into the exhaust stream. The portion of the intake air which is compressed by the main engine compressor is ducted to the rotary intake manifold, the orifices of which traverse the vaned cylinders of the stationary drum, and into the vaned cylinders. Fuel is injected either into the compressed air as it proceeds into the stationary vaned cylinders or directly into the vaned cylinders after they have received the air charge. In either case, the vaned cylinders are fired and the exhausted gases are received by a rotary exhaust manifold as the orifices thereof traverse the stationary vaned cylinders. The exhaust gases from the one stationary drum of vaned cylinders proceed from the rotary exhaust manifold through a first stage turbine nozzle and are expanded through two turbines, which operate the several compressors utilized by the engine, whereupon they are exhausted through the exhaust nozzle into the atmosphere along with that portion of the intake air which by-passes the main compressor and the vaned cylinder combustion chambers.

*Brief description of the drawings*

Reference is made to the drawings forming a part hereof and in which:

FIGURE 1 is a partial cut-away perspective view of one embodiment of the instant invention.

FIGURE 1a is a fragmentary broken away perspective view showing the scavenging means for the outer drum of rotary firing cylinders when they are in the open position.

FIGURE 1b is a fragmentary cross-sectional view taken along the line 1b—1b of FIGURE 1a when the scavenging means are in the closed position.

FIGURE 1c is a fragmentary cross-sectional view taken along the line 1c—1c of FIGURE 1.

FIGURE 2 is a longitudinal cross-sectional view taken along the line 2—2 of FIGURE 1.

FIGURE 3 is a cross-sectional view taken along the line 3—3 of FIGURE 2.

FIGURE 4 is a cross-sectional view taken along the line 4—4 of FIGURE 2.

FIGURE 5 is a cross-sectional view taken along the line 5—5 of FIGURE 2.

FIGURE 6 is a cross-sectional view taken along the line 6—6 of FIGURE 2.

FIGURE 20 is a longitudinal cross-sectional view of a fourth embodiment of the instant invention.

FIGURE 21 is a cross-sectional view taken along the line 21—21 of FIGURE 20.

FIGURE 22 is a cross-sectional view taken along the line 22—22 of FIGURE 20.

FIGURE 23 is a cross-sectional view taken along the line 23—23 of FIGURE 20.

FIGURE 24 is a cross-sectional view taken along the line 24—24 of FIGURE 20.

FIGURE 25 is a cross-sectional view taken along the line 25—25 of FIGURE 20.

FIGURE 26 is a cross-sectional view taken along the line 26—26 of FIGURE 20.

*Description of the preferred embodiment*

Figure 7:
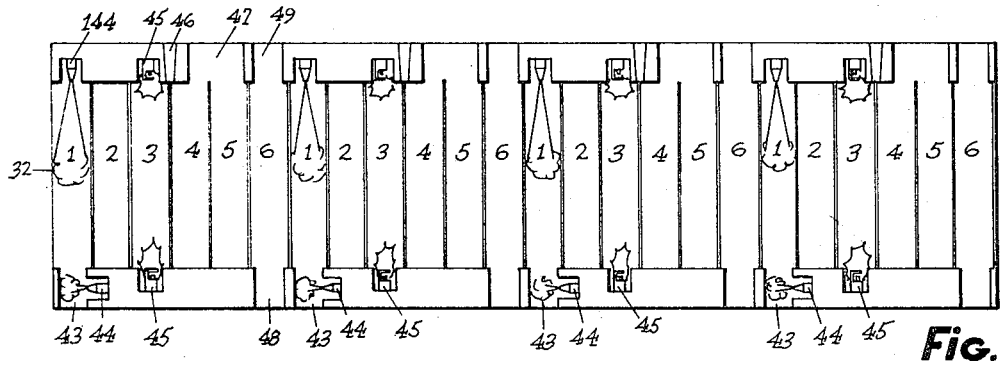
FIGURE 7 shows a schematic representation of the ring of cells surrounding the rotor and manifold positioning for an embodiment of the instant invention.

Referring now in more detail to the drawings, and, in particular, to FIGURES 1 through 8 which discloses the first embodiment of the instant invention, it may be seen that the engine is housed in an outside casing 19. Air enters the intake 12 and is initially compressed by the low stage or ancillary engine compressor 14, which consists of rotor blades 15 and stator blades 16. The rotor blades 15 add kinetic energy to the air stream in an axial direction, and the stator blades 16 convert this kinetic energy into pressure energy. A portion of the air stream from the ancillary compressor 14 is by-passed around the high stage or main engine compressor 17 and the rotary firing vaned cylinder combustion chambers 23 and 25 and, as will be explained in more detail hereinafter, is utilized for scavenging, cooling and other purposes. The portion of the air which has not been by-passed passes into the high stage or main engine compressor 17 where kinetic energy, added to the air stream in an axial direction by the rotor blades 18, is converted into pressure energy by the stator blades 19.

The exit end of the main engine compressor 17 is surrounded by the exhaust manifold 20 from which extend a plurality of ducts 21a and 21b. As can best be seen from FIGURES 1 and 2, the ducts 21a pass compressed air to the intake manifold 22 which communicates with the outer rotary drum of vaned combustion cylinders 23, and the ducts 21b pass air to the intake manifold 24 which communicates with the inner rotary drum of vaned combustion cylinders 25. The intake manifolds 22 and 24 are stationary, being held to the casing 10 by the struts or braces 22a, and to each other by the struts or braces 24a, as best seen in FIGURE 5.

As can best be seen from FIGURES 2 and 4, the inner and outer drums of vaned combustion cylinders 25 and 23, respectively, rotate about a central shaft indicated generally at 26. The central shaft 26 runs substantially the length of the engine and comprises an inner shaft 26a joining the low stage or ancillary engine compressor 14 with the second or low stage turbine 27, and an outer shaft 26b joining the high stage or main engine compressor 17 with the first or high stage turbine 28. The outer and inner rotary drums 23 and 25, respectively, both comprise outer and inner shells 29 and 30, respectively, which have been divided by radial walls 31 into cylinders or chambers 32. The outer drum 23 is joined for rotation with the inner drum 25 by means of the brackets 33. The brackets 34 are rotatably mounted at one end to a housing 34a, which rotates around the central shaft 26, and at the opposite end to the inner shell 30 of the inner drum 25. Disposed intermediate of the ends of the outer shell 29 of the outer vaned drum 23 are the teeth 35. The inner and outer drums 25 and 23, respectively, are caused to rotate by means of the motor 26 mounted within the protruding cavity 37 in the outside casing 10, which rotates a shaft 38 carrying a gear 39 which meshes with the teeth 35.

The rotary cylinders 23 and 25 communicate with the exhaust manifolds 40 and 41, respectively. The exhaust manifolds 40 and 41 are stationary, being held to the casing 10 by the struts or braces 40a and to each other by the struts or braces 41a, as best seen in FIGURE 6. The exhaust manifold 40 leads either directly to the rear housing or into the atmosphere, while the exhaust manifold 41 acts as a transition liner, directing the exhaust from the inner rotary cylinders 25 toward the turbine nozzle 42.

Figure 8:
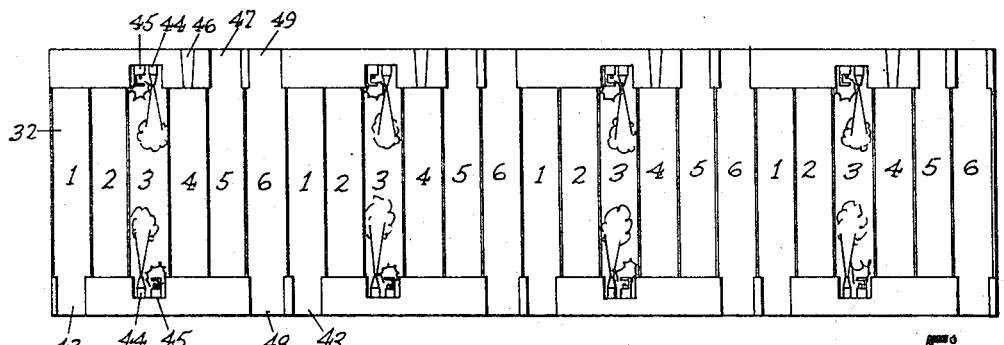
FIGURE 8 is a schematic representation of the ring of cells surrounding the rotor and manifold positioning for an embodiment of the instant invention when the engine is to be controlled by the amount of fuel injected or by the combination of fuel which is injected and air intake.

FIGURES 7 and 8 both show a schematic representation of one ring of vaned cylinders and the intake and exhaust manifold positioning associated therewith. In particular, FIGURE 7 shows a situation where fuel is injected directly into the air intake, and FIGURE 8 shows a situation where fuel is injected into the cylinders 32 after they have received intake air. It will be understood that the situation depicted in FIGURE 8 would be utilized when the engine is to be controlled by the amount of fuel which is injected or by the combination of fuel which is injected and the air intake.

FIGURE 4, a section through both rotary drums 23 and 25, discloses that each rotary drum is divided into 24 cylinder chambers 32. FIGURES 7 and 8 indicate that the engine utilizes four cycles. However, it will be understood that while four cycles are utilized and while twenty-four chambers 32 are shown on each drum, the number of cycles and the number of chambers 32 depend upon the timing or speed of rotation of the drums 23 and 25, the intake air and fuel pressures.

Turning now to FIGURE 7, four cycles of air intake and fuel injection, ignition, exhaust and scavenging are shown. When each chamber 32 is in the positon 1, it traverses an orifice 43, as shown in FIGURE 5, and intake air is injected into the chamber 32. As can be seen, each rotary drum has four orifices 43 corresponding to the number of cycles, each orifice being connected by the ducts 21a or 21b to the main engine compressor 17. As the intake air passes through the orifices 43, fuel is injected by the fuel injection nozzles 44 in the intake manifolds 22 and 24. Should it be desired, fuel injection nozzles may also be located at the position 1 in the exhaust manifolds 40 and 41 so as to assure proper fuel-air mixture. When the chambers 32 reach the position 3, the fuel-air mixture contained therein is ignited by means of the spark igniter 45. To assure ignition, two spark igniters 45 may be used. The relief valve 46 is provided between the positions 3 and 4 to guard against premature ignition before the exhaust nozzles 47 in the exhaust manifolds 40 and 41 are traversed. When the chambers 32 reach the positions 6 they traverse the orifices 48 in the intake manifolds 22 and 24 and the orifice 49 in the exhaust manifold. Scavenge air enters the chambers 32 through the orifices 48 in the intake manifolds 22 and 24 and completely scavenges the chambers 32 before they again reach a position 1 to start the cycle again.

The scavenging air through the orifices 48 is either ram air from outside the engine which is directed into the intake manifold, or by-pass air from the ancillary engine compressor 14, or a combination of both. When the engine of the instant invention is in motion, such as in flight, the rotating collar 50, as best seen in FIGURES 1a and 1b, may be rotated about the outer housing 10, so that ram air may be ducted through the openings 51 and directly into the orifices 48 in the outer intake manifold 22 for the outer rotary drum of cylinders 23. Before the body to which the engine is attached has attained sufficient motion so that the ram air may be used entirely or partially for scavenging purposes, the rotating collar 50 is in a position such that the openings 51 do not communicate with the orifices 48, as best seen in FIGURE 1b, and by-pass air from the auxiilary engine compressor 14 is free to enter the orifices 48 in the outer intake manifold 22 for the outer rotary drum of cylinders 23. By-pass air from the auxiliary compressors 14 is always utilized to scavenge the chambers 32 of the inner drum of rotary cylinders 23 through the orifices 48 in the inner intake manifold 24.

Turning now to FIGURE 8, it may be seen that the only real difference between the cycles shown in FIGURE 8 and those shown in FIGURE 7 is that the fuel is not injected directly into the intake air stream at the position 1 in FIGURE 8 as it is in FIGURE 7. Rather, the fuel is injected into the chambers 32 when they are in the position 3. Fuel may, of course, be injected into the chambers 32 from both the intake and exhaust manifolds.

Provision must be made to seal the chambers 32 of the rotary drums 23 and 25. While this may be accomplished in any satisfactory manner, the instant invention preferably provides lap joints 52 and blades 53 to break the chambers 32 and to seal the ends of the rotary drums 23 and 25 from the manifolds 22 and 24, and 40 and 41, respectively. As can best be seen from FIGURES 1, 1b and 1c, the lap joints 52 are actually portions of the intake and exhaust manifolds which overlap the inner and outer shells, 30 and 29, respectively, of the drums 23 and 25. Surrounding the orifices in both the intake and exhaust manifolds which are contiguous with the chamber 32, and the ends of the chambers 32 are the blades 53. The blades 53, of course, prevent discharge from the orifices into or from a chamber 32 which is not in communication with its proper orifice.

After the chambers 32 in both the inner and outer drums 25 and 23, respectively, have been fired, the exhaust therefrom proceeds through the orifices 47 in the exhaust manifolds 40 and 41, and through the multiple exhaust nozzles 47a, as best seen in FIGURE 6. The exhaust from the chambers 32 of the outer drum 23 may either be directed into the atmosphere (not shown), or into the rear engine housing 10 where it subsequently mixes with the exhaust from the chambers 32 of the inner drum 25, as will be more fully explained hereinafter. The exhaust gases from the firing of the chambers 32 of the inner drum 23 proceed through the orifices 47 in the inner exhaust manifold 41 and into the multiple exhaust nozzles 47a which direct it toward the turbine nozzle 42.

The chambers 32 in the inner and outer drums 25 and 23 are then scavenged, as referred to earlier, and the scavenged air is ducted into the atmosphere as shown in FIGURE 1c. It will be understood that the ducts 54 and 55 shown in FIGURE 1c proceed from the scavenge orifices 48 in the inner and outer exhaust manifolds, respectively, and that there will be one duct 54 or 55 for each engine cycle in the outer and inner drums 23 and 25, respectively.

The inner exhaust manifold 41, in essence, serves as a transition liner between the firing chambers 32 of the inner drum 25 and the high pressure or first stage turbine 28 and low pressure or second stage turbine 27. As can best be seen from FIGURES 1 and 2, the exhaust end of the exhaust manifold 41 comprises two walls 56 which form a chamber 57 to receive the exhaust from the four series of ducts 57a leading from the exhaust nozzles 47a and change it into one annular stream which is directed into the turbine nozzle 42. The turbine nozzle 42 then directs the exhaust stream into the turbine buckets 58 in the first stage turbine 28 which operates the high stage or main engine compressor 17. After the exhaust gases have been expanded through the first stage turbine 28, they expand through the second stage turbine 27 which operates the low stage or ancillary engine compressor 14. The turbine buckets 58 of the first and second stage turbines 28 and 27, respectively, are provided with a shrouded section 59 at the outer end of the turbine blade 60 so as to form a continuous rim or shroud around the outer ends of the blades 60. This provides both for higher efficiency due to prevention of gas losses over the blade tips and support for the blades 60 against vibration. Additionally, the turbine blades 60 are of hollow construction. The by-pass air from the low stage or ancillary engine compressor 14 proceeds through the engine, and that portion of the by-pass air which is not utilized for scavenging purposes in either the inner or outer drums 25 and 23, respectively, is utiilzed to cool the inner and outer exhaust manifolds 40 and 41, turbine nozzle 42, and the turbine blades 60. As can be seen from FIGURES 1 and 2, the inner portion 61 of the inner exhaust manifold 41 is hollow. Likewise, the turbine nozzle 42 is also hollow. Some of the by-pass air proceeds through the inner portion 61 of the exhaust manifold 41 and the hollow portion of the turbine nozzle 42 after which it is directed through the hollow turbine blades 60 and out into the chamber 62 between the outer casing 10 and the turbine blades 60, where it is subsequently mixed with the exhaust gases before they are allowed to exit.

The exhaust cone 63 is located directly behind the second stage turbine 27, and its main function is to collect discharge gases from the second stage turbine 27 and expel them at the correct velocity, producing thrust. The exhaust cone 63 comprises an outer shell 64 and a central cone 65 supported from the outer shell 64 and the casing 10 by streamlined struts 66. The function of the streamlined struts 66 is to straighten out the air flow from approximately 45° to an axial direction. Air flowing through this section decreases in velocity and increases in pressure. The outer surface of the exhaust cone 63 is insulated to reduce the heat losses.

A convergent nozzle 67 is provided at the exit end of the jet pipe 68. The convergent nozzle 67 provides the final speed up of the gas stream to atmosphere so that the exhaust jet is at its maximum velocity.

Numerous ancillary systems are, of course, necessary to provide a complete and operable jet engine system. Such example ancillary systems include a starting system, a fuel supply system, and a lubrication system. A starter system is necessary to provide a means for high speed rotation of the compressors 14 and 17 and auxiliary means for rotating the firing chambers 32. Any one of the four types of starting systems presently in general use may be utilized: an electric starter, a slow-burning cartridge which drives a small turbine, a liquid fuel turbo starter, or an air starter.

Generally there are four ways to control the engine of the instant invention: by throttle controlling the air intake; by controlling the amount of fuel injected; via a combination of controlling the air intake and controlling the fuel injection, through proper linkage between fuel and air supplies; and via the speed of rotation of the drums of chambers 32. When the engine is controlled by controlling the amount of fuel injected, the fuel injection outlets should be near a spark ignitor 45, and the fuel injected at or near contact points, as shown in FIGURE 8. Such an arrangement avoids too lean a mixture of fuel and air prior to ignition. If the speed of rotation of the drums of the chambers 32 is utilized to control the engine, the motor 36 can control the rotation of the drums.

Another ancillary system includes lubrication of the engine. Lubrication oil from an oil tank (not shown) flows through pipes and passages to lubricate the main shaft bearings and the wheel cases. The oil may be sprayed at the bearings and gear meshing points through a series of small jets (not shown).

Turning now to the second disclosed embodiment, as shown in FIGURES 9 through 13, it will be seen that this embodiment differs from the first embodiment only in that one drum of vaned cylinders is utilized, the exhaust therefrom being directed through the turbines and into the atmosphere.

Figure 9:
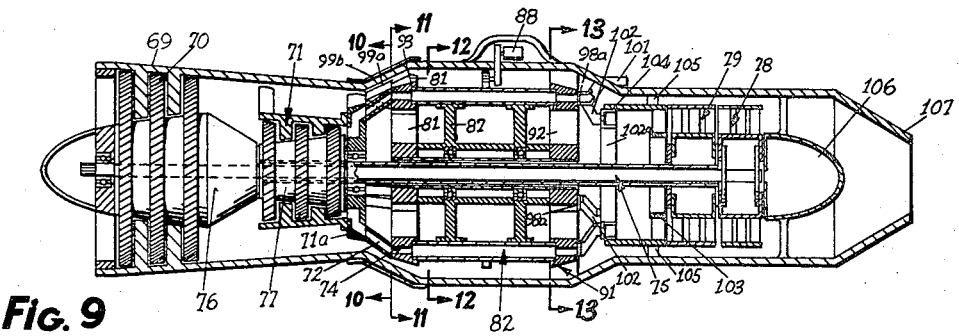
FIGURE 9 is a longitudinal cross-sectional view of another embodiment of the instant invention which utilizes only one drum of rotary firing cylinders.
Figure 10:
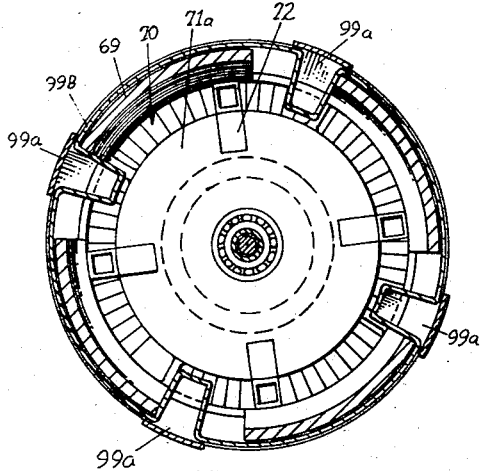
FIGURE 10 is a cross-sectional view taken along the line 10—10 of FIGURE 9.

The perspective view shown in FIGURE 1, while generally of the first embodiment, also indicates the general features of the second embodiment. As best seen in FIGURE 9, the engine of the second embodiment is housed in a casing 69. A low stage or ancillary engine compressor 70 initially compresses intake air. Part of the initially compressed intake air is by-passed through the engine and is utilized for cooling and scavenging purposes, as will be explained in more detail hereinafter, and the remainder is further compressed in the high stage or main engine compressor 71. Ducts 72 lead from the manifold 71a of the high stage or main compressor 71 and direct compressed intake air into the intake manifold 74. A central shaft 75 comprising an inner drive shaft 76 and an outer drive shaft 77 power the low stage and high stage compressors 70 and 71, respectively. The drive shafts 76 and 77 are powered by the turbines 78 and 79, respectively, as will be more fully explained hereinafter.

Figure 11:
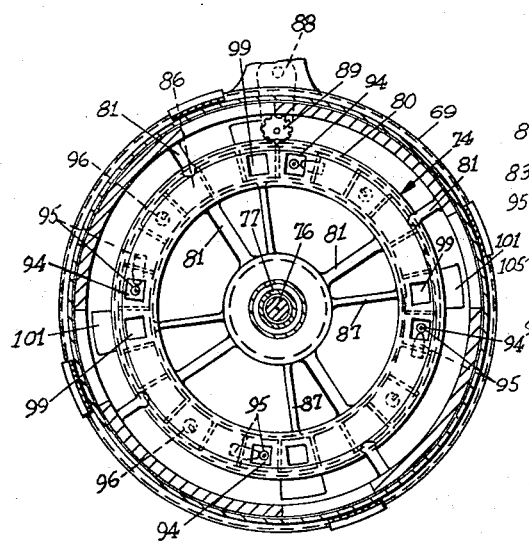
FIGURE 11 is a cross-sectional view taken along the line 11—11 of FIGURE 9.

The intake manifold 74, as best seen in FIGURES 9 and 11, comprises a ring section 80 held in place in the casing 69 by the struts 81. The ring portion 80 of the intake manifold 74 contains various orifices which correspond to the cycling of the engine. While the engine will be described in terms of four cycles, it will be understood that the number of cycles may vary, depending upon the speed of rotation of the drum of cylinders 82, the pressure of the fuel, and other variables.

Figure 12:
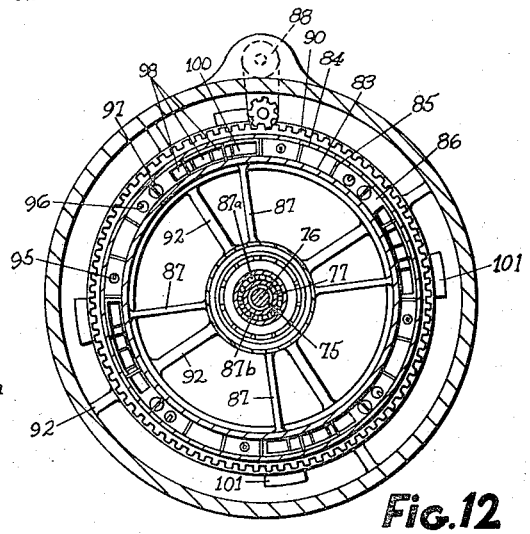
FIGURE 12 is a cross-sectional view taken along the line 12—12 of FIGURE 9.

The drum of cylinders 82, as best seen in FIGURE 12, comprises inner and outer shell portions 83 and 84, respectively, which are divided by the vanes or walls 85 into cylinders or chambers 86. The drum of cylinders 82 is mounted for rotation about the central shaft 75 by the struts 87. As can be seen, the central shaft 75, is surrounded by a housing 87a which forms an oil reservoir. The struts 87 are mounted for rotation within the housing 87a utilizing the bearings 87b. A motor 88 having a gear train 89 meshes with the gear teeth 90 on the periphery of the outer portion 84 of the drum of cylinders 82. In this manner the rotation of the drum may be controlled.

Figure 13:
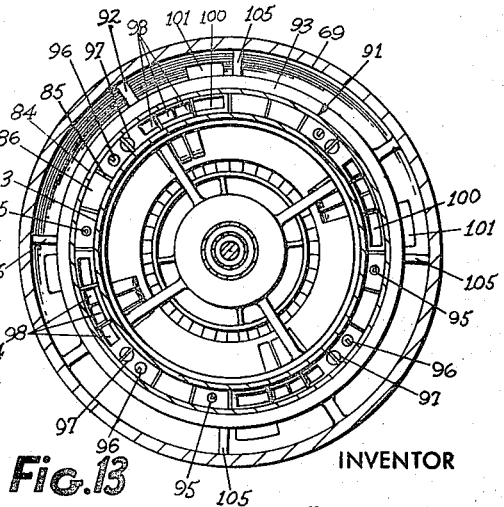
FIGURE 13 is a cross-sectional view taken along the line 13—13 of FIGURE 9.

An exhaust manifold 91, as best seen in FIGURE 13, is held stationary by the struts 92 and communicates with the cylinders or chambers 86 of the drum of cylinders 82. The exhaust manifold 91, like the intake manifold 74, also contains various orifices which the cylinders or chambers 86 of the drum 82 travers as they are rotated.

As can be seen, the ends of the cylinders or chambers 86 fit within the intake and exhaust manifolds 74 and 91, respectively, by lap joints 93. Additionally, the orifices in the manifolds 74 and 91 and the ends of the chambers 86 are surrounded by the blades 93a. The lap joints 93 and the blades 93a help to assure that intake air, fuel and exhaust gases do not escape, and that proper pressure is maintained in the cylinders or chambers 86.

A schematic representation of the cylinders or chambers 86 of the drum 82, the intake manifold 74 and the exhaust manifold 91 is identical with that shown in FIGURES 7 and 8 discussed earlier. The ducts 72 from the high stage compressor 71 pass intake air into the orifices 94 in the intake manifold 74. It will be understood that there are as many ducts 72 and orifices 94 as there are cycles desired. Fuel may be injected into the air stream immediately by means of the fuel injectors 95 located within the orifices 94. However, fuel injection can be deferred until later in the cycle as explained in connection with the first embodiment. As the cylinders or chambers 86 progress in their rotation, a spark igniter 96 ignites the fuel-air mixture in the chambers 86. A relief valve 97, as best seen in FIGURE 13, may be provided to prevent disastrous results from premature firing. As the fired cylinders continue to rotate, the exhaust gases proceed through the orifices 98 in the exhaust manifold and through the multiple exhaust nozzles 98a. After the fired chambers are exhausted, they are scavenged by by-pass air through the orifices 99 in the intake manifold, by ram air through the ports 99a in the casing 10, or by a combination of both. As was explained in connection with embodiment No. 1, a rotating collar 99b rotates about the outer housing 69 so that ram air may be ducted through the ports 99a and directly into the orifices 99 in the intake manifold. Before the body to which the engine is attached has attained sufficient motion so that ram air may be used for scavenging purposes, the rotating collar 99b is in a position such that the ports 99a do not communicate with the orifices 99, and by-pass air from the auxiliary engine compressor 70 is free to enter the orifices 99 in the intake manifold 71. The scavenged air then proceeds through the orifices 100 in the exhaust manifold and out the ducts 101 which lead through the outer casing 69 and into the atmosphere. As can best be seen from FIGURE 9, the orifices 99 in the intake manifold 74, which receive the by-pass air for scavenging purposes, are directly open to the interior of the engine.

The exhaust manifold 91 comprises a series of ducts 102, each of which receives exhaust gases from an exhaust nozzle 98a and directs it into a chamber 102a where it is emitted as an annular stream into the turbine nozzle 103. The turbine nozzle 103 is connected with the exhaust manifold 91 by means of a lap joint 104, and is held stationary within the outer casing 69 by the struts 105. Exhaust gases proceeding through the turbine nozzle 103 are directed most advantageously toward the first stage turbine 79, which powers the high stage or main engine compressor 71, and expanded therethrough. The exhaust gases are then expanded through the second stage turbine 78 which powers the low stage or ancillary engine compressor 70. Each turbine 78 and 79 comprises turbine blades 105a which are hollow and of shrouded construction as explained in connection with the first embodiment. The second embodiment also uses by-pass air to cool the exhaust manifold 91, the turbine nozzle 103 and the turbine blades 105a, after which the air is directed out of the hollow turbine blades 105a and into the exhaust stream.

The exhaust cone 106 and the jet pipe 107 are identical in all respects with the exhaust cone 63 and jet pipe 68 of the first embodiment.

Turning now to FIGURES 14 through 19, the third embodiment of the instant invention will be explained. The engine of the third embodiment is housed within the outer casing 108. Intake air is initially compressed by the low stage or ancillary engine compressor 109. A portion of the initially compressed air is by-passed through the engine and the remainder is further compressed by the high stage or main engine compressor 110. Ducts 111 lead from the exhaust manifold 112 of the high stage engine compressor 110. As will be explained more fully hereinafter, the central drive shaft 113, comprising the inner drive shaft 114, which powers the low stage compressor 109, and the outer shaft 115, which powers the high stage compressor 110, extends substantially the length of the engine. The ends of the ducts 111 opposite the exhaust manifold 112 of the high stage compressor 110 communicate with the stationary rings 113a and 113b. As was the case with the first and second embodiments, the third embodiment will also be described in terms of a four cycle engine. However, it will be understood that the number of cycles and the number of firing cylinders will vary depending upon the rotation speed of the intake and exhaust manifolds, the fuel pressure, and other variables.

In the four cycle description of the third embodiment, there will be eight ducts 111, each duct conducting compressed intake air to the first stage of each cycle. Since there are two drums of cylinders, an inner drum of cylinders 116 and an outer drum of cylinders 117, each drum of cylinders passing through four cycles upon each revolution thereof, eight ducts 111 are required.

At the end of the ducts 111 opposite the exhaust manifold 112 of the high stage compressor 110 are the rings 118a and 118b. The rings 118a and 118b are stationary and are held in place by the struts 119. Additionally, the ducts 111 are stabilized by the struts 120 which hold them to the outer casing 108. The rings 118a and 118b contain orifices 121a and 121b, and 122a and 122b. The orifices 121a and 121b in the rings 118a and 118b, respectively, communicate with the ducts 111 supplying compressed intake air from the high stage compressor 110. The orifices 122a and 122b in the rings 118a and 118b receive by-pass air, which is used for scavenging purposes, from the low stage compressor 109. While the scavenging orifices 122a and 122b may, at all times, receive by-pass air directly from the low stage compressor 109, a collar 123, identical with the collar 51 of the first embodiment, as best seen in FIGURES 1a and 1b, having four ports 124 open to the atmosphere, may be rotated when the body to which the engine is attached has reached sufficient speed so that the ports 124 are in alignment with the orifices 122a in the outer ring 118a, whereby the ram air is directed for scavenging purposes through the orifices 143 in the outer intake manifold 130a and into the cylinders 129 in the outer drum 117.

The inner and outer drums 116 and 117, respectively, are stationary within the outer casing 108, being held firmly in place by means of the struts 125. Each drum comprises an outer shell 126 and an inner shell 127 separated by vanes 128 which divide the drum into chambers or cylinders 129. The intake manifolds 130a and 130b are disposed between the statiionary rings 118a and 118b and the stationary chambers or cylinders 129 of the drums 116 and 117. The intake manifolds 130a and 130b are not stationary but are caused to rotate, as will be explained more fully hereinafter. The intake manifolds 130a and 130b are positioned together by means of the struts 131 and revolve about the central shaft 113.

The inner and outer exhaust manifolds 132b and 132a communicate with the exhaust end of the cylinders 129, the outer exhaust manifold 132a communicating with the outer drum of cylinders 117, and the inner exhaust manifold 132b communicating with the inner drum of cylinders 116. The exhaust manifolds 132a and 132b are positioned together by means of the struts 133 and revolve about the central shaft 113.

The intake manifolds 130a and 130b and the exhaust manifolds 132a and 132b are preferably caused to rotate together by means of the motor 134, mounted for protection within the shield 135 on the outer casing 108. The motor 134 carries a shaft 136 having at each end a gear 137 with gear train means which meshes with the teeth 138 on the periphery of the outer intake manifold 130a and the outer exhaust manifold 132a.

The firing of the cylinders 129 of the drums 116 and 117 is identical to the firing of the cylinders of the first embodiment, as shown in FIGURES 7 and 8. Again, it will be understood that while the firing of the cylinders is described in terms of four cycles or firings per revolution of a drum, such description is only exemplary.

As the intake manifolds 130a and 130b and the exhaust manifolds 132a and 132b are caused to rotate, various orifices contained therein traverse the cylinders 129 of the stationary drums 116 and 117. Additionally, the intake manifolds 130a and 130b traverse orifices in the rings 118a and 118b. When the orifices 139 in the intake manifolds 130a and 130b traverse the orifices 121a and 121b, respectively, in the rings 118a and 118b, compressed intake air from the high stage compressor 110 is directed into the cylinders 129. Fuel is mixed directly with the incoming compressed air by means of the fuel injectors 140 located within the orifices 139. As the intake manifolds are further rotated, spark igniters 141 ignite the fuel-air mixture in the cylinders 129. The spark igniters 141 may also be located at positions in the exhaust manifolds 132a and 132b in direct alignment with their location in the intake manifolds 130a and 130b. Relief valves 141a are provided in the exhaust manifolds 132a and 132b in case of premature firing of the cylinders or chambers 129. After the cylinders 129 have been fired, the exhaust therefrom proceeds through the orifices 142 in the exhaust manifolds 132a and 132b, as the exhaust manifolds are rotated. Finally, after the exhaust gases have been exhausted from the cylinders 129, scavenging air, either by-pass air from the low stage compressor 109 or ram air from the orifices 124 in the rotating collar 123, as was fully explained above, enters the cylinders 129 when the orifices 143 in the intake manifolds 130a and 130b traverse the orifices 122a and 122b located in the stationary rings 118a and 118b, respectively. The scavenging air directed into the cylinders 129 is exhausted through the orifices 144 in the exhaust manifold.

It will be understood that the intake manifolds 130a and 130b and the exhaust manifolds 132a and 132b will rotate together, and, therefore, orifices located in the intake manifolds and in the exhaust manifolds always remain properly positioned.

Figure 19:
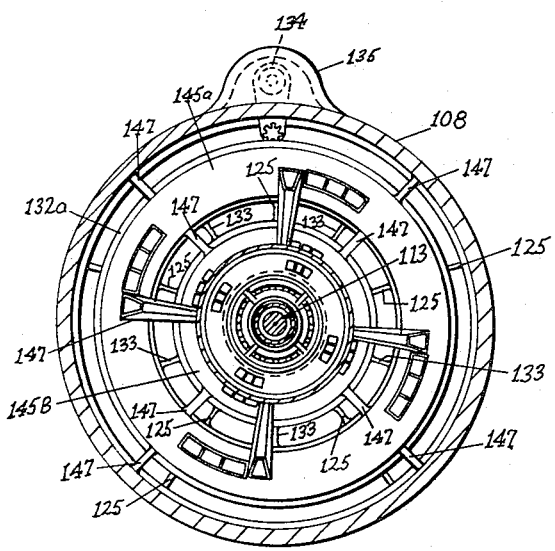
FIGURE 19 is a cross-sectional view taken along the line 19—19 of FIGURE 14.
Figure 14:
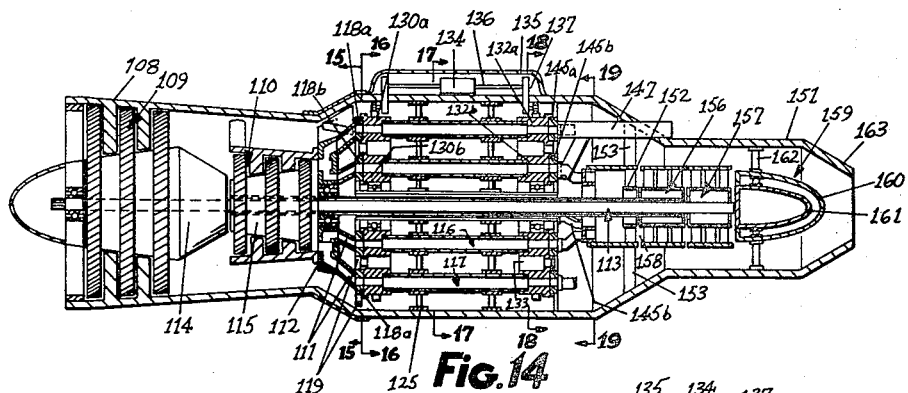
FIGURE 14 is a longitudinal cross-sectional view of a third embodiment of the instant invention.
Figure 15:
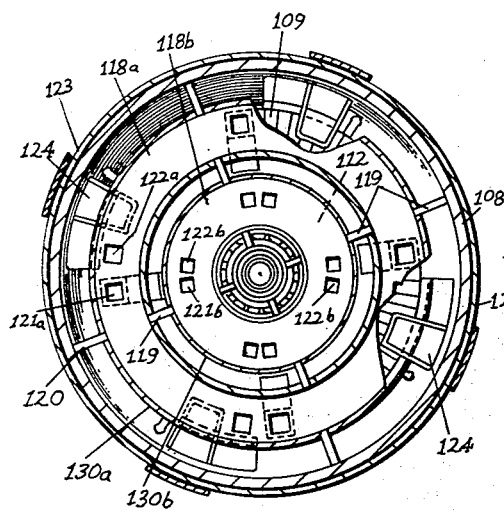
FIGURE 15 is a cross-sectional view taken along the line 15—15 of FIGURE 14.
Figure 16:
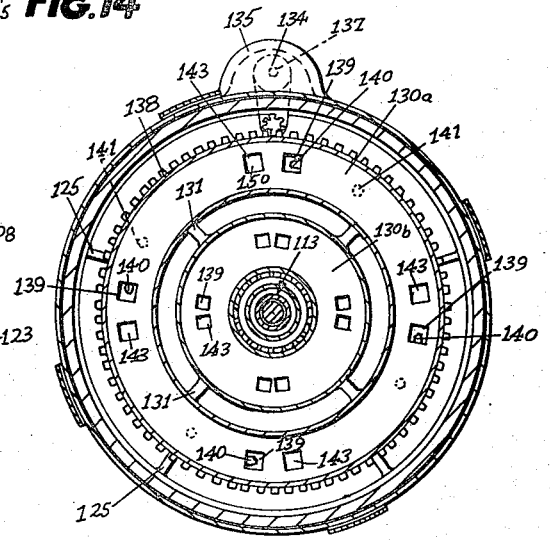
FIGURE 16 is a cross-sectional view taken along the line 16—16 of FIGURE 14.
Figure 17:
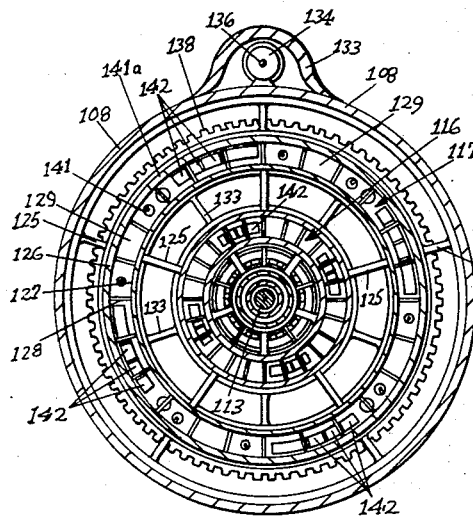
FIGURE 17 is a cross-sectional view taken along the line 17—17 of FIGURE 14.
Figure 18:
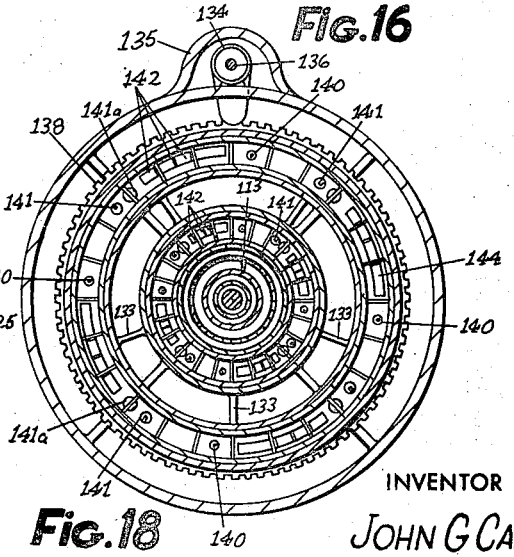
FIGURE 18 is a cross-sectional view taken along the line 18—18 of FIGURE 14.

Stationary rings 145a and 145b, as best seen in FIGURES 14 and 19, are provided around the exhaust manifolds 132a and 132b so that exhausted scavenging air from the orifices 144 in the exhaust manifolds may be ducted by means of the ducts 146 through the outer casing 108 and into the atmosphere. The stationary rings 145a and 145b are supported within the outer casing 108 by means of the struts 147.

In order to minimize compression losses, lap joints 148, T grooves 149 and blades 150 are utilized. The overlapping edges 148 extend, for example, over the sides of the stationary rings 118a and 118b. Also, the overlapping edges 148 extend over the inner and outer shells 127 and 126, respectively, of the drums 116 and 117. All the orifices, such as, for example, the orifices in the rings 118a and 118b and the orifices in the intake manifolds 130a and 130b, are surrounded by the blades 150. Additionally, overlapping members, such as, the intake manifolds 130a and 130b, contain grooves 149 therein which receive the ends of the rings 118a and 118b, and the ends of the cylinders 129 in the drums 116 and 117.

The exhaust from the orifices 142 in the outer exhaust manifold 132a proceeds through the exhaust nozzle 151 and either directly into the atmosphere or, as is shown, into the rear engine housing, while the exhaust from the orifices 142 in the inner exhaust manifold 132b is directed into an annular stream and proceeds into the turbine nozzle 152. It should be noted that the turbine nozzle 152 is held stationary within the outer housing 108 by means of the struts 153. As can be seen, compression is maintained between the turbine nozzle 152 and the exhaust manifold 132b by means of the overlapping edge 148 and the liner contained therein.

The turbine nozzle 152 directs the exhaust into the first and second stage turbines 156 and 157, respectively. The turbine blades 158 on both the first and second stage turbines 156 and 157, respectively, are hollow and of shrouded construction, carrying segments at their outer tips. The shrouded construction provides for a higher efficiency due to prevention of gas losses over the blade tips and supports the blades against vibration. The hollow construction of the turbine blades provides for cooling. This is accomplished by means of the by-pass air which proceeds through the center of the exhaust manifold 132b, then into the center of the turbine nozzle 152 and finally into the hollow blades 158. The by-pass, air, in this manner, provides a cooling effect for the exhaust manifolds 132a and 132b, the turbine nozzle 152 and the turbine blades 158. After the by-pass air exists from the turbine blades 158 it mixes with the exhaust gases that are being expended through the first and second stage turbines 156 and 157, respectively.

The exhaust cone 159 comprises an outer shell 160 and a central cone 161 supported from the outer shell 160 by means of the streamlined struts 162. The function of the streamlined struts 162 is to straighten out the air flow from approximately 45° to an axial direction. Air flowing through this section thus decreases in velocity and increases in pressure. The outer surface of the exhaust cone 159 is insulated to reduce the heat losses. It is the purpose of the exhaust cone 159 to collect discharge gases from the second stage turbine 157 and to expel them at the correct velocity through a convergent nozzle 163 which is provided at the exit end of the exhaust nozzle. Additionally, the convergent nozzle 163 provides the final speed up of the gas stream to atmosphere so that the jet is at its maximum velocity.

Numerous ancillary systems are, of course, necessary to provide a complete and operable jet engine system. Such example ancillary systems as a starting system, a fuel supply system and a lubrication system were described in connection with the first and second embodiments.

Turning now to FIGURES 20 through 26, the engine of the fourth embodiment will be explained. The engine of the fourth embodiment is housed in the outer casing 165. Intake air is initially compressed in the low stage or ancillary engine compressor 166. A portion of the initially compressed air from the low stage compressor 166 is further compressed in the high stage or main engine compressor 167 and the remainder is bypassed through the engine, as will be more fully explained hereinafter. A central shaft 168 extends the length of the engine. The central shaft 168 comprises an inner shaft 169 and an outer shaft 170. The outer shaft 170 and the inner shaft 169 are connected to the first stage and second stage turbines 171 and 172, respectively, and power the high stage compressor 167 and the low stage compressor 166, respectively. The ducts 173 leading from the exhaust manifold 174 of the high stage compressor 167 conduct the compressed intake air through the stationary ring 175 and into the rotating intake manifold 176. The ducts 173 are held in place by the struts 177, and the stationary rings 175 are held in place by the struts 178.

This embodiment will be described in terms of four firing cycles per revolution of the firing cylinders, and, therefore, there will be four ducts 173 conducting compressed intake air to the cylinders 180, one duct for each cycle. It will be understood, however, that the number of firing cycles per revolution depends upon many variables and that the use of four cycles per revolution is only exemplary.

The drum 179 of cylinders 180 is stationary and mounted within the outer casing 165 by means of the struts 181. The drum comprises an inner shell 182 and an outer shell 183 which are divided by vanes 184 into chambers or cylinders 185. The intake manifold 176 and the exhaust manifold 186 are not stationary, but are caused to rotate by means of the motor 187 mounted within the outer casing 165. The motor 187 carries shafts 188 which rotate the gears 189 which mesh with the teeth 190 on on the periphery of both the intake manifold 176 and the exhaust manifold 186. As can be seen, both the intake manifold 176 and the exhaust manifold 186 will be revolved at the same speed.

The intake manifold 176 rotates about the central shaft 168, being held in place by means of the struts 191 and the bearings 191a. The intake manifold 176 comprises an annular ring 192 containing orifices therein and lip portions 193. On either side of the annular rings 192 are grooves 194, the purpose of which will be more fully explained hereinafter.

As was explained above, the fourth embodiment also is being described in terms of four cycles per revolution of the intake and exhaust manifolds 176 and 186, respectively. Therefore, the annular ring 192 of the intake manifold 176 will contain four series of orifices. The orifices 195 communicate with the orifices 196 in the stationary ring 175, which in turn communicate with the ducts 173 supplying compressed intake air from the high stage compressor 167. Fuel injectors 197, located within the orifices 195 in the intake manifold 176 and within the exhaust manifold 186, inject fuel into the compressed intake air. Spark igniters 198, located within the annular ring 192 of the intake manifold 176 and within the annular ring 186a in the exhaust manifold 186 fire the air-fuel mixture in the chambers or cylinders 185. After the cylinders 185 have been fired and exhausted, by-pass air entering the orifices 199 in the stationary ring 175 proceeds through the orifices 200 in the annular ring 192 and scavenges the fired cylinder 185. While the scavenging orifice 199 in the stationary ring 175 may, at all times, receive by-pass air directly from the low stage compressor 166, a collar 165a, identical with the collar 51 of the first embodiment, as best seen in FIGURES 1a and 1b, having four ports 165b open to the atmosphere, may be rotated when the body to which the engine is attached has reached sufficient speed so that the ports 165b are in alignment with the orifices 199 in the stationary ring 175, whereby ram air is directed for scavenging purposes through the orifices 200 in the rotating intake manifold and into the fired cylinders 185.

The exhaust manifold 186 includes an annular ring 186a having lip portions 186b, and grooves 186c. Exhaust orifices 201, in communication with the exhaust nozzles 202 and the orifices 203 leading to the ducts 204 which extend from the stationary ring 205 into the outer casing 165, are located in the annular ring 186a. The ducts 204 direct the scavenge air into the atmosphere. The stationary ring 205 is held in place by means of the struts 206. Additionally, a relief valve 207 is provided within the annular ring 186a of the exhaust manifold 186 and the stationary ring 205 in case of premature firing of the cylinders 185.

The orifices in the intake and exhaust manifolds 176 and 186, respectively, along with the fuel injectors 197, the spark igniters 198 and the relief valve 207, are arranged in accordance with the previous discussion in connection with FIGURES 7 and 8 of the first embodiment. As can be seen, compressed intake air from the ducts 173 proceeds through the orifices 196 in the stationary ring 175. The compressed intake air is directed into the cylinders 185 as the orifices 196 in the stationary ring 175 and the orifices 195 in the intake manifold 176 are aligned with the cylinders 185 when the intake manifold 176 is rotated by the motor 187. The compressed intake air passes through the orifices 195 in the intake manifold 176 and the fuel injectors 197 inject fuel into the stream so that the cylinders are provided with an air-fuel mixture. As the intake and exhaust manifolds 176 and 186, respectively, continue to traverse the cylinders 185, the spark igniters 198 cause the fuel-air mixture in the cylinders 185 to be fired. In case there is premature firing, the relief valves 207 provide exhaust ports. After the cylinders 185 have been fired, the exhaust gases proceed through the orifices 201 in the exhaust manifold 186. The fired and exhausted cylinders 180 are then scavenged when either by-pass or ram air or a combination of both enters the orifices 199 in the stationary ring 175. The scavenging air is directed from the cylinders 185 into the orifices 203 in the exhaust manifold and then into the ducts 204 in the stationary ring 205 and into the atmosphere.

It will be understood that the intake and exhaust manifolds 176 and 186, respectively, rotate together, and that the orifices contained therein will be properly aligned so that engine firing may be accomplished.

The exhaust gases from the exhaust nozzles 202 are directed into an annular stream within the manifold 205a. The annular stream of exhaust gases then proceeds into the turbine nozzle 208. The turbine nozzle 208 is held stationary within the outer casing 165 by means of the struts 209. Lap joints 210 of the turbine nozzle overlap the edge of the exhaust manifold 186. Additionally, a groove within the turbine nozzle receives the end of the exhaust manifold 186. Lapping joints 210 and grooves, along with blades 211 are utilized to prevent loss of compression between the rotating intake and exhaust manifolds 176 and 186, respectively, and the stationary components to which they communicate. All the orifices involved in all the components overlap the stationary components and fit within grooves contained therein.

The turbine nozzle 208 directs the exhaust gases against the hollow blades 212 of the first and second stage turbines, 171 and 172, respectively. The turbine blades 212 are provided with shrouded sections 213 at their outer ends so as to form a continuous rim or shroud. The shrouded portions 213 of the turbine blades 212 provide for higher efficiency due to prevention of gas losses over the blade tips and additionally support for the blades against vibration.

By-pass air from the low stage compressor 166 proceeds through the engine and is utilized to cool the exhaust manifold 186, the turbine nozzle 208 and the hollow turbine blades 212. As can be seen from FIGURES 20, 24, 25 and 26, the inner portion 214 of the exhaust manifold 186 is hollow. Likewise, the turbine nozzle 208 is also hollow. The by-pass air proceeds through the inner portion 214 of the exhaust manifold 186 and the hollow portion of the turbine nozzle 208, after which it is directed through the hollow turbine blades 212 and out into the chamber 216 between the outer casing 165 and the turbine blades 212, where it is mixed with the exhaust gases expanding through the first and second stage turbines, 171 and 172, respectively, before it is allowed to exit.

The exhaust cone 217 is located directly behind the second stage turbine 172, and its main function is to collect discharge gases from the second stage turbine 172 and expel them at the correct velocity. The exhaust cone 217 comprises an outer shell 218 and a central cone 219 supported from the outer shell 218 by streamlined struts 220. As was previously mentioned in connection with the other embodiments, the function of the streamlined struts 220 is to straighten out the air flow from approximately 45° to an axial direction. Air flowing through this section decreases in velocity and increases in pressure. Additionally, the outer surface of the exhaust cone 217 is insulated to reduce the heat losses. A convergent nozzle 221 is provided at the exit end of the jet pipe 222. The convergent nozzle 221 provides the final speed up of the gas stream to atmosphere so that the jet is at its maximum velocity.

Again, numerous ancillary systems are, of course, necessary to provide a complete and operable jet engine system for the fourth embodiment. Such example ancillary systems, including a starting system, a fuel supply system and a lubricating system, were explained in connection with the other embodiments.

It will be understood that modifications may be made without departing from the spirit of the invention, and therefore no limitations other than those specifically set forth in the claims are intended or should be implied. For example, if the engine of the instant invention is to be utilized in a stationary manner, shaft turbines may be used to convert the exhaust thrust to horsepower. Further, any combination of rotating and stationary manifolds and stationary and rotating drums of firing cylinders may be used as long as either each rotating drum has corresponding stationary manifolds, or reach stationary drum has corresponding rotating manifolds. Additionally, in lieu of open end cylinders which utilize intake and exhaust manifolds, closed end cylinders with control valves controlling the admission of intake air and the exhaust of gases may be used. Also, a chamber may be located before the first and second turbines to aid in cooling the exhaust gases before their expansion through the turbines.

The embodiments of the invention in which an exclusive property or privilege is claimed are defined as follows:

1. In a constant volume combustion gas turbine engine which comprises:
   (a) an outer casing which extends substantially the entire length of said engine;
   (b) an auxiliary engine compressor to initially compress intake air, a portion of said initially compressed intake air being by-passed through said engine and fed into the gas stream immediately before exhaustion into the atmosphere;
   (c) a main engine compressor rearwardly of said ancillary engine compressor to further compress that portion of said intake air which is not by-passed through said engine;
   (d) a combustion chamber associated with said main engine compressor for receiving said further compressed intake air;
   (e) a fuel injector for injecting fuel into said further compresesd intake air in said combustion chamber;
   (f) a spark igniter to ignite said fuel-air mixture in said combustion chamber;
   (g) a turbine nozzle at the exhaust end of said combustion chamber to properly direct said exhaust gas stream from said combustion chamber;
   (h) a main engine turbine for powering said main engine compressor as said exhaust gas stream directed from said turbine nozzle is expanded therethrough;
   (i) an auxiliary engine turbine for powering said auxiliary engine compressor, said exhaust gas stream after expansion through said engine turbine being further expanded through said ancillary engine turbine; and
   (j) an exhaust system which receives both the exhaust gas stream after its further expansion through said auxiliary engine turbine and said by-pass gases from said auxiliary engine compressor, and which directs this combined gas stream into the atmosphere at a correct velocity;

the improvement wherein:
   (a) said combustion chamber comprises at least one drum of cylinders, said drum comprising an outer shell and an inner shell separated by vanes into cylinders;
   (b) at least one intake manifold disposed between said main engine compressor and one end of said drum and communicating with said cylinders of said drum;
   (c) means to convey compressed intake air from said main engine compressor to said intake manifold;
   (d) at least one exhaust manifold disposed between the other end of said drums and said turbine nozzle, said exhaust manifold communicating with said cylnders of said drum and acting as a transition liner between said drum and said turbine nozzle, converting said exhaust gas stream into an annular stream; and
   (e) means for rotating relative to one another said drum, and said intake and exhaust manifolds.

2. The apparatus according to claim 1, wherein
   (a) said combustion chamber comprises two drums of cylinders, an inner drum within an outer drum, said inner drum and outer drums being locked together for common movement;
   (b) said intake manifold comprises an inner intake manifold within an outer intake manifold, said inner and outer intake manifolds being locked together and fixedly attached to the inside of said outer casing, each said inner and outer intake manifolds having orifices therein, said orifices in said intake manifold communicating with said cylinders of said inner drum, and said orifices of said outer intake manifold communicating with said cylinders of said outer drum;
   (c) said exhaust manifold comprises an inner exhaust manifold within an outer exhaust manifold, said inner and outer exhaust manifolds being locked together and fixedly attached to the inside of said outer casing, each said inner and outer exhaust manifolds having orifices therein, said orifices in said inner exhaust manifold communicating with said cylinders of said inner drum, said orifices of said outer exhaust manifold communicating with said cylinders of said outer drum, said outer exhaust manifold exhausting said exhaust gas stream from said cylinders of said outer drum, and said inner exhaust manifold directing said exhaust gas stream from said cylinders of said inner drum into an annular stream and into said turbine nozzle; and
   (d) said two drums of inner and outer cylinders rotate together, relative to said intake and exhaust manifolds.

3. The apparatus according to claim 2 wherein said means for rotating said two drums of inner and outer cylinders together, relative to said intake and exhaust manifolds, comprises:
   (a) a peripheral row of gear teeth surrounding said outer shell of said outer drum; and
   (b) a motor mounted within said outer casing, said motor having an attached shaft carrying a gear thereon which meshes with said row of teeth on said outer drum, whereby as said motor rotates said shaft, said gear meshes with said teeth and said outer and inner drums are caused to rotate together, said cylinders of said outer drum and said cylinders of said inner drum traversing said orifices in said inner and outer intake manifolds and said inner and outer exhaust manifolds, respectively.

4. The apparatus according to claim 3, wherein said means to convey intake air from said main engine compressor to said inner and outer intake manifolds comprises a series of ducts, one end of each said duct being attached to said main engine compressor so as to receive compressed intake air therefrom, the other end of each said duct being attached to one said intake manifold so as to communicate with one said orifice in said intake manifold, there being one duct to each said intake manifold for each firing cycle around said intake manifold, the cylinders of said drums proceeding through the number of firing cycles around each said manifold during each revolution of said drums.

5. The apparatus according to claim 4 wherein said fuel nozzles are associated with each said orifice in said intake manifolds which communicate with said ducts from said main engine compressor, whereby fuel is injected into said compressed intake air from said main engine compressor as said compressed intake air passes through said orifices which communicate with said ducts, said fuel-air mixture then proceeding into said cylinders of said inner and outer drums, as said drums are rotated and said cylinders traverse said orifices which communicate with said ducts.

6. The apparatus according to claim 5 wherein at least one said spark igniter is mounted in each said inner and outer intake manifolds for each said firing cycle, said spark igniter firing said fuel-air mixture within said cylinders in said inner and outer drums as said drums rotate and said cylinders traverse said spark igniters in said inner and outer intake manifolds.

7. The apparatus according to claim 6 wherein at least one relief valve is mounted in each said inner and outer exhaust manifolds for each said firing cycle, said relief valve providing a means for exhausting said cylinder if premature firing should occur.

8. The apparatus according to claim 7 wherein a scavenge orifice open to the inside of said engine for each cycle in each said inner and outer intake manifolds is in alignment with a scavenge orifice for each cycle in each said inner and outer exhaust manifolds, respectively, each said scavenge orifice in said inner and outer exhaust manifolds communicating with a duct leading through said outside casing to the atmosphere, whereby said scavenge orifices in said inner and outer intake manifolds receive said by-pass air from said auxiliary compressor, said by-pass air scavenging said fired and substantially exhausted cylinders of said inner and outer drums as said inner and outer drums are rotated and said cylinders of said inner and outer drums traverse said scavenge orifices in said inner and outer intake manifolds, respectively, and said scavenge air from said cylinders of said inner and outer drums is exhausted through said scavenge orifices in said inner and outer exhaust manifolds as said inner and outer drums rotate and said cylinders traverse said scavenge orifices in said inner and outer exhaust manifolds, respectively.

9. The apparatus according to claim 8 wherein a collar is mounted for rotation around said outer casing immediately in front of said scavenge orifices in said outer intake manifold, said collar having therein a scavenge port open to the outside of said outer casing for each cycle in said outer intake manifold, and means for rotating said collar such that each said scavenge port may align with a corresponding scavenge orifice in said outer intake manifold, whereby outside air may be utilized in the range of zero to completely to scavenge said fired and substantially exhausted cylinders of said outer drum as said outer drum is rotated and said cylinders of said outer drum traverse said scavenge orifices of said outer intake manifold.

10. The apparatus according to claim 1 wherein:
(a) said intake manifold contains orifices therein which communicate with said cylinders of said drum;
(b) said exhaust manifold contains orifices therein which communicate with said cylinders of said drum; and
(c) said drum of cylinders rotates relative to said intake and exhaust manifolds.

11. The apparatus according to claim 10 wherein said means for rotating said drum of cylinders relative to said intake and exhaust manifolds, comprises:
(a) a peripheral row of gear teeth surrounding said outer shell of said drum; and
(b) a motor mounted to said outer casing, said motor having an attached shaft carrying a gear thereon which meshes with said row of teeth on said drum, whereby, as said motor rotates said shaft, said gear meshes with said teeth and said drum is caused to rotate, said cylinders of said drum traversing said orifices in said intake manifold and said exhaust manifold.

12. The apparatus according to claim 11 wherein said means to convey intake air from said main engine compressor to said intake manifold comprises a series of ducts, one end of each said duct being attached to said main engine compressor so as to receive compressed intake air therefrom, the other end of each said duct being attached to said intake manifold so as to communicate with one said orifice in said intake manifold, there being one duct to said intake manifold for each firing cycle around said intake manifold, the cylinders of said drum proceeding through the number of firing cycles around said intake manifold during each revolution of said drum.

13. The apparatus according to claim 12 wherein said fuel nozzle are associated with each of said orifices in said intake manifold which communicate with said ducts from said main engine compressor, whereby fuel is injected into said compressed intake air from said main engine compressor as said compressed intake air passes through said orifice which communicate with said ducts, said fuel-air mixture then proceeding into said cylinders, of said drum, as said drum is rotated and said cylinders traverse said orifices which communicate with said ducts.

14. The apparatus according to claim 13 wherein at least one said spark igniter is mounted in said intake manifold for each said firing cycle, said spark igniter firing said fuel-air mixture within said cylinder in said drum as said drum rotates and said cylinders traverse said spark igniters in said intake manifold.

15. The apparatus according to claim 14 wherein at least one relief valve is mounted in said exhaust manifold for each said firing cycle, said relief valve providing a means for exhausting said cylinders if premature firing should occur.

16. The apparatus according to claim 15 wherein a scavenge orifice open to the inside of said engine for each cycle in said intake manifold is in alignment with a scavenge orifice for each cycle in each said inner and outer exhaust manifold, respectively, each said scavenge orifice in said exhaust manifold communicating with a duct leading through said outside casing to the atmosphere, whereby said scavenge orifices in said intake manifold receives by-pass air from said auxiliary compressor, said by-pass air scavenging said fired and substantially exhausted cylinders of said drum as said drum is rotated and said cylinders traverse said scavenge orifices in said intake manifold, and said scavenge by-pass air from said cylinders of said drum is exhausted through said scavenge orifices in said exhaust manifold as said drum rotates and said cylinders traverse said scavenge orifices in said exhaust manifold.

17. The apparatus according to claim 16 wherein a collar is mounted for rotation around said outer casing immediately in front of said scavenge orifice in said intake manifold, said collar having therein a scavenge port open to the outside of said outer casing for each cycle in said intake manifold, and means for rotating said collar such that each said scavenge port may align into a corresponding scavenge orifice in said outer intake manifold, whereby outside air may be utilized in the range of none to completely to scavenge said fired and substantially exhausted cylinders of said drum as said drum is rotated and said cylinders of said drum traverse said scavenge orifices of said intake manifold.

18. The apparatus according to claim 1, wherein:
(a) said combustion chamber comprises two drums of cylinders, an inner drum within an outer drum, said inner and outer drums being locked together and attached to the inside of said outer casing;
(b) said intake manifold comprises an inner intake manifold within an outer intake manifold, said inner and outer intake manifolds being locked together for common movement, each said inner and outer intake manifold having orifices therein, said orifices in said inner intake manifold communicating with said cylinders of said inner drum, and said orifices of said outer intake manifold communicating with said cylinders of said outer drum;
(c) said exhaust manifold comprises an inner exhaust manifold within an outer exhaust manifold, said inner and outer exhaust manifolds being locked together for common movement, each said inner and outer exhaust manifolds having orifices therein, said orifices in said inner exhaust manifold communicating with said cylinders of said inner drum, said orifices of said outer exhaust manifold communicating with said cylinders of said outer drum, said outer exhaust manifold exhausting said exhaust gas stream from said cylinders of said outer drum, and said inner exhaust manifold directing said exhaust gas stream from said cylinders of said inner drum into an annular stream and into said turbine nozzle; and
(d) said inner and outer intake manifolds and inner and outer exhaust manifolds rotate together, relative to said inner and outer drums.

19. The apparatus according to claim 18 wherein said means for rotating said inner and outer intake manifolds and said inner and outer exhaust manifolds together, relative to said inner and outer drums, comprises:
(a) a peripheral row of gear teeth attached to and surrounding the periphery of said outer intake manifold and said outer exhaust manifold; and
(b) a motor mounted within said outer casing, said motor having two attached shafts, each shaft carrying a gear thereon which meshes with one said row of teeth, whereby as said motor rotates said shafts, said gears mesh with said teeth and said inner and outer intake manifolds and said inner and outer exhaust manifolds are caused to rotate together, whereby said orifices of said inner and outer intake manifolds and said orifices of said inner and outer exhaust manifolds traverse said cylinders in said inner and outer drums, respectively.

20. The apparatus according to claim 19 wherein said means to convey intake air from said main engine compressor to said inner and outer intake manifolds comprises:
(a) a series of ducts, one end of each said duct being attached to said main engine compressor so as to receive compressed intake air therefrom, there being one duct for each firing cycle around both said inner and outer intake manifolds; and
(b) inner and outer stationary intake rings, said inner and outer stationary intake rings having orifices herein corresponding to the intake orifices in said inner and outer intake manifolds, respectively, there being one intake orifice for each firing cycle around said inner and outer intake manifolds, the other end of each said duct being attached around one said orifice in one said stationary ring, whereby as said inner and outer manifolds are caused to rotate, the intake orifices contained therein traverse the intake orifices in said stationary inner and outer intake rings, respectively, and said compressed intake air travels into said cylinders of said stationary inner and outer drums as said intake orifices in said inner and outer intake manifolds traverse said cylinders in said inner and outer drums, respectively.

21. The apparatus according to claim 20 wherein said fuel nozzles are associated with each said intake orifice in said intake manifolds which communicate with said intake orifices in said stationary intake ring, whereby fuel is injected into said compressed intake air from said main engine compressor as said compressed intake air passes through said intake orifices in said stationary intake rings which communicate with said ducts, said fuel-air mixture then proceeding into said cylinders of said inner and outer drums, as said inner and outer intake manifolds rotate and said intake orifices in said inner and outer intake manifolds traverse said cylinders of said drums.

22. The apparatus according to claim 21 wherein at least one spark igniter is mounted in each said inner and outer intake manifolds for each said firing cycle, said spark igniter firing said fuel-air mixture within said cylinders to said inner and outer drums as said inner and outer intake manifolds rotate and said spark igniters in said inner and outer intake manifolds traverse said cylinders in said inner and outer drums, respectively.

23. The apparatus according to claim 22 wherein at least one relief valve is mounted in each said inner and outer exhaust manifolds for each said firing cycle, said relief valve providing a means for exhausting said cylinders of said drum if premature firing thereof should occur.

24. The apparatus according to claim 23 wherein:
(a) a scavenge orifice open to the inside of said engine is provided in said inner and outer stationary rings for each cycle in each said inner and outer intake manifolds, respectively;
(b) a scavenge orifice for each cycle in each said inner and outer intake manifolds is in alignment with a scavenge orifice for each cycle in each said inner and outer exhaust manifolds respectively,
(c) inner and outer stationary exhaust rings having scavenge orifices therein corresponding to said scavenge orifices in said inner and outer stationary intake rings, and ducts leading from said scavenge orifices in said exhaust rings through said outer casing and into the atmosphere,
each said scavenge orifice in said inner and outer exhaust manifolds communicating with said scavenge orifices in said stationary exhaust rings as said inner and outer intake and exhaust manifolds are rotated and said scavenge orifices in said inner and outer exhaust manifolds traverse said scavenge orifices in said stationary exhaust rings, whereby said scavenge orifices in said inner and outer stationary intake rings receive by-pass air from said auxiliary compressor, said by-pass air scavenging said fired and substantially exhausted cylinders of said inner and outer drums as said inner and outer intake and exhaust manifolds are rotated, and said scavenge orifices in said inner and outer intake manifolds traverse said scavenge orifices in said inner and outer stationary intake rings, respectively, said cylinders of said inner and outer drums, respectively, and said scavenge orifices in said inner and outer exhaust manifolds traverse said cylinders in said inner and outer drums, respectively, and said scavenge orifices of said inner and outer exhaust manifolds traverse said scavenge orifice in said stationary exhaust ring.

25. The apparatus according to claim 24 wherein a collar is mounted for rotation around said outer casing immediately in front of said scavenge orifice in said outer stationary intake ring, said collar having therein a scavenge port open to the outside of said outer casing for each scavenge orifice in said outer stationary intake ring, and means for rotating said collar such that each said scavenge port may align with a corresponding scavenge orifice in said outer intake ring, whereby outside air may be utilized in the range of none to completely to scavenge said fired and substantially exhausted cylinders of said outer drum as said outer intake and exhaust manifolds are rotated and said scavenge orifices therein traverse said cylinders of said outer drum.

26. The apparatus according to claim 1 wherein:
 (a) said combustion chamber comprises one drum of stationary cylinders mounted within said outer casing;
 (b) said intake manifold contains orifices therein which communicates with said cylinders of said drum;
 (c) said exhaust manifold contains orifices therein which communicates with said cylinders of said drum, and
 (d) said intake manifold and said exhaust manifold rotate together, relative to said drum of cylinders.

27. The apparatus according to claim 26 wherein said means for rotating said intake manifold and exhaust manifold together, relative to said inner and outer drum comprises:
 (a) a peripheral row of gear teeth attached to and surrounding the periphery of said intake manifold and said exhaust manifold; and
 (b) a motor mounted within said outer casing, said motor having two attached shafts, each shaft carrying a gear thereon which meshes with one said row of teeth, whereby, as said motor rotates said shafts, said gears mesh with said teeth and said intake manifold and said exhaust manifold are caused to rotate together, said orifices of said intake manifold and said orifices of said exhaust manifold traversing said cylinders in said drum.

28. The apparatus according to claim 27 wherein said means to convey intake air from said main engine compressor to said intake manifold comprises:
 (a) a series of ducts, one end of each said duct being attached to said main engine compressor so as to receive compressed intake air therefrom, there being one duct for each firing cycle around said intake manifold; and
 (b) a stationary intake ring having orifices therein corresponding to the number of intake orifices in said intake manifold, there being one intake orifice for each firing cycle around said intake manifold, the other end of each said duct being attached around one said intake orifice in said stationary ring, whereby, as said intake manifold is caused to rotate, the intake orifices therein traverse the intake orifices in said stationary intake ring, and said compressed intake air travels into said cylinders of said stationary drum as said intake orifices in said intake manifold traverse said cylinders in said drum.

29. The apparatus according to claim 28 wherein said fuel nozzles are associated with each said intake orifice in said intake manifold which communicate with said intake orifices in said stationary intake ring, whereby fuel is injected into said compressed intake air from said main engine compressor as said compressed intake air passes through aid intake orifices in said stationary intake ring which communicate with said ducts, said fuel-air mixture then proceeding into said cylinders of said drum as said intake manifold rotates and said intake orifices in said intake manifold traverse said cylinders of said drum.

30. The apparatus according to claim 29 wherein at least one spark igniter is mounted within each said intake manifold for each said firing cycle, said spark igniter firing said fuel-air mixture within said cylinders in said drum as said intake manifold rotates and said spark igniters in said intake manifold traverse said cylinders in said drum.

31. The apparatus according to claim 30 wherein at least one relief valve is mounted in said exhaust manifold for each said firing cycle, said relief valve providing a means for exhausting said cylinders of said drum if premature firing thereof should occur.

32. The apparatus according to claim 31 wherein:
 (a) a scavenge orifice open to the inside of said engine is provided in said stationary intake ring for each cycle in said intake manifold;
 (b) a scavenge orifice for each cycle in said intake manifold is in alignment with a scavenge orifice for each cycle in said exhaust manifold; and
 (c) a stationary exhaust ring having scavenge orifices therein corresponding to said scavenge orifices in said stationary intake ring, and ducts from said scavenge orifices in said exhaust ring through said outer casing to the atmosphere;
 each said scavenge orifice in said exhaust manifold communicating with said scavenge orifices in said stationary exhaust ring as said intake and exhaust manifolds are rotated and said scavenge orifices in said exhaust manifold traverse said scavenge orifices in said stationary exhaust ring, whereby said scavenge orifices in said stationary intake ring receive by-pass air from said auxiliary compressor, said by-pass air scavening said fired and substantially exhaused cylinders of said drums as said intake and exhaust manifolds are rotated, and said scavenge orifices in said intake manifold traverse said scavenge orifices in said stationary ring and said cylinders in said drums, said scavenge orifices in said exhaust manifolds traverse said cylinders in said drum, and said scavenge orifices of said exhaust manifold traverse said scavenge orifices in said stationary exhaust ring.

33. The apparatus according to claim 32 wherein a collar is mounted for rotation around said outer casing immediately in front of said scavenge orifices in said stationary intake ring, said collar having therein a scavenge port open to the outside of said outer casing for each scavenge orifice in said intake ring, and means for rotating said collar such that each said scavenge port may align with a corresponding scavenge orifice in said intake ring, whereby outside air may be utilized in the range of none to completely to scavenge said fired and substantially exhausted cylinders of said drum as said intake and exhaust manifolds are rotated and said scavenge orifices therein traverse said cylinders of said drum.

References Cited

UNITED STATES PATENTS

| 2,515,644 | 7/1950 | Goddard | 60—247 X |
| 2,705,867 | 4/1955 | Lewis | 60—39.34 |
| 2,942,412 | 6/1960 | Bollay | 60—247 |
| 3,188,804 | 6/1965 | Melenric | 60—248 |

FOREIGN PATENTS 897,771   11/1953   Germany.

CARLTON R. CROYLE, *Primary Examiner.*

U.S. Cl. X.R.

60—39.78, 248, 263, 262